US008138114B2

(12) United States Patent
Jen et al.

(10) Patent No.: US 8,138,114 B2
(45) Date of Patent: Mar. 20, 2012

(54) METHODS AND FORMULATIONS FOR ENHANCING NH$_3$ ADSORPTION CAPACITY OF SELECTIVE CATALYTIC REDUCTION CATALYSTS

(75) Inventors: Hungwen Jen, Troy, MI (US); George Graham, Ann Arbor, MI (US); Robert McCabe, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 12/884,690

(22) Filed: Sep. 17, 2010

(65) Prior Publication Data
US 2011/0003682 A1 Jan. 6, 2011

Related U.S. Application Data

(62) Division of application No. 11/539,722, filed on Oct. 9, 2006, now Pat. No. 7,811,961.

(51) Int. Cl.
*B01J 23/00* (2006.01)
*B01J 21/00* (2006.01)
*B01J 20/00* (2006.01)

(52) U.S. Cl. ........ 502/304; 502/104; 502/250; 502/263; 502/340; 502/341; 502/349; 502/350; 502/351; 502/415; 502/439

(58) Field of Classification Search .................. 502/104, 502/250, 304, 340, 341, 349, 350, 351, 415, 502/439, 263
See application file for complete search history.

(56) References Cited

U.S. PATENT DOCUMENTS

| | | | |
|---|---|---|---|
| 3,819,536 A | 6/1974 | Dalla Betta et al. |
| 3,972,837 A | 8/1976 | Acres et al. |
| 4,001,371 A | 1/1977 | Remeika et al. |
| 4,049,583 A | 9/1977 | Lauder |
| 4,077,913 A | 3/1978 | Acres et al. |
| 4,089,810 A | 5/1978 | Diwell et al. |
| 4,127,510 A | 11/1978 | Harrison et al. |
| 4,162,235 A | 7/1979 | Acres et al. |
| 4,200,554 A | 4/1980 | Lauder |
| 4,956,330 A | 9/1990 | Elliott et al. |
| 5,064,803 A | 11/1991 | Nunan |
| 5,427,753 A | 6/1995 | Miura et al. |
| 5,435,981 A | 7/1995 | Ichiki et al. |
| 5,449,504 A | 9/1995 | Kasahara et al. |
| 5,589,147 A | 12/1996 | Farnos et al. |

(Continued)

FOREIGN PATENT DOCUMENTS
EP   0 625 633 A1   11/1994
(Continued)

OTHER PUBLICATIONS

Paul J. Gellings et al., "Solid State Aspects of Oxidation Catalysis", Catalysis Today 58 (2000), pp. 1-53.

(Continued)

*Primary Examiner* — Cam N Nguyen
(74) *Attorney, Agent, or Firm* — Damian Porcari; Brooks Kushman P.C.

(57) ABSTRACT

A method of providing an automobile exhaust catalyst composition. The method includes acidifying a support composition with a conjugate base oxide of an inorganic acid having a Ka to obtain an acidified support exhaust catalyst composition. The support composition includes a combination of a cerium-containing oxide compound and non-cerium-containing compound selected from the group consisting of alkali metal containing compounds, alkaline-earth metal containing compounds and combinations thereof.

20 Claims, 1 Drawing Sheet

U.S. PATENT DOCUMENTS

| | | | |
|---|---|---|---|
| 5,597,771 | A | 1/1997 | Hu et al. |
| 5,635,142 | A | 6/1997 | Ichiki et al. |
| 5,747,401 | A | 5/1998 | Cuif |
| 5,747,410 | A | 5/1998 | Muramatsu et al. |
| 5,756,057 | A | 5/1998 | Tsuchitani et al. |
| 5,837,212 | A | 11/1998 | Hepburn et al. |
| 5,879,645 | A | 3/1999 | Park et al. |
| 5,972,821 | A | 10/1999 | Nojima et al. |
| 5,989,507 | A | 11/1999 | Sung et al. |
| 5,992,142 | A | 11/1999 | Pott |
| 6,003,303 | A | 12/1999 | Peter-Hoblyn et al. |
| 6,087,298 | A | 7/2000 | Sung et al. |
| 6,174,835 | B1 | 1/2001 | Naito et al. |
| 6,350,423 | B1 | 2/2002 | Aoyama |
| 6,391,822 | B1 | 5/2002 | Dou et al. |
| 6,419,890 | B1 | 7/2002 | Li |
| 6,477,834 | B1 | 11/2002 | Asanuma et al. |
| 6,492,297 | B1 | 12/2002 | Sung |
| 6,497,848 | B1 | 12/2002 | Deeba et al. |
| 6,531,425 | B2 | 3/2003 | Golden |
| 6,555,492 | B2 | 4/2003 | Faber et al. |
| 6,620,762 | B2 | 9/2003 | Tan et al. |
| 6,699,448 | B2 | 3/2004 | Wu et al. |
| 6,777,370 | B2 | 8/2004 | Chen |
| 6,821,925 | B2 | 11/2004 | Carruthers et al. |
| 6,852,666 | B1 | 2/2005 | Bouly et al. |
| 6,864,212 | B2 | 3/2005 | Tanev |
| 6,923,945 | B2 | 8/2005 | Chen |
| 7,213,395 | B2 | 5/2007 | Hu et al. |
| 2002/0076373 | A1 | 6/2002 | Molinier et al. |
| 2002/0103078 | A1 | 8/2002 | Hu et al. |
| 2002/0139112 | A1 | 10/2002 | Onodera et al. |
| 2002/0155040 | A1 | 10/2002 | Sakanushi et al. |
| 2003/0021745 | A1 | 1/2003 | Chen |
| 2003/0083194 | A1 | 5/2003 | Sung |
| 2003/0103886 | A1 | 6/2003 | Dou |
| 2003/0106306 | A1 | 6/2003 | Nakatani et al. |
| 2003/0139288 | A1 | 7/2003 | Cai et al. |
| 2003/0147796 | A1 | 8/2003 | Suga et al. |
| 2003/0154713 | A1 | 8/2003 | Hiratsuka et al. |
| 2003/0172646 | A1 | 9/2003 | Hiratsuka et al. |
| 2003/0175192 | A1 | 9/2003 | Hu et al. |
| 2003/0181324 | A1 | 9/2003 | Hotta et al. |
| 2003/0198582 | A1 | 10/2003 | Golden |
| 2004/0043343 | A1 | 3/2004 | Kamijo |
| 2004/0077492 | A1 | 4/2004 | Yaluris et al. |
| 2004/0198595 | A1 | 10/2004 | Chen |
| 2004/0209772 | A1 | 10/2004 | Fukunaga et al. |
| 2005/0148463 | A1 | 7/2005 | Jen et al. |
| 2006/0034741 | A1 | 2/2006 | Li et al. |
| 2006/0035782 | A1 | 2/2006 | Jen et al. |

FOREIGN PATENT DOCUMENTS

| | | | |
|---|---|---|---|
| EP | 0 625 633 | B1 | 11/1994 |
| EP | 0 982 487 | A1 | 3/2000 |
| EP | 1 241 329 | A2 | 9/2002 |
| EP | 1 302 647 | A2 | 4/2003 |
| EP | 1 318 282 | A1 | 6/2003 |
| EP | 0 982 487 | B1 | 7/2003 |
| EP | 1 413 718 | A1 | 4/2004 |
| JP | 2001-009271 | A | 1/2001 |
| WO | 00/50168 | A1 | 8/2000 |
| WO | 01/09271 | A1 | 2/2001 |
| WO | 02/09852 | A2 | 2/2002 |
| WO | 02/058825 | A2 | 8/2002 |
| WO | 02/083301 | A2 | 10/2002 |
| WO | 03/008095 | A2 | 1/2003 |
| WO | 03/040259 | A2 | 5/2003 |

OTHER PUBLICATIONS

Michael D. Kass et al., "Selective Catalytic Reduction of Diesel Engine NOX Emissions Using Ethanol as a Reductant", Proceedings: 2003 DEER Conference; U.S. Department of Energy 9th Diesel Engine Emissions Reduction Conference, Newport, Rhode Island, Aug. 24 to 28, 2003, pp. 1-8.

Information Disclosure Statement for U.S. Appl. No. 11/156,898, dated Jun. 20, 2005.

Non-final Office Action for U.S. Appl. No. 11/156,898, dated Jul. 31, 2008.

Non-final Office Action for U.S. Appl. No. 11/156,898, dated Dec. 3, 2008.

Information Disclosure Statement for U.S. Appl. No. 11/156,898, dated May 26, 2009.

Information Disclosure Statement for U.S. Appl. No. 11/156,898, dated Jun. 24, 2009.

Information Disclosure Statement for U.S. Appl. No. 11/156,898, dated Jun. 26, 2009.

Final Office Action for U.S. Appl. No. 11/156,898, dated Mar. 6, 2009.

Notice of Allowance for U.S. Appl. No. 11/156,898, dated Jun. 3, 2009.

Information Disclosure Statement U.S. Appl. No. 11/157,192, dated Jun. 20, 2005.

Supplemental Information Disclosure Statement for U.S. Appl. No. 11/157,192, dated Jan. 23, 2007.

Information Disclosure Statement for U.S. Appl. No. 11/157,192, dated Sep. 18, 2008.

Non-final Office Action for U.S. Appl. No. 11/157,192, dated Oct. 28, 2008.

Information Disclosure Statement for U.S. Appl. No. 11/157,192, dated Jan. 5, 2009.

Information Disclosure Statement for U.S. Appl. No. 11/157,192, dated May 26, 2009.

Non-final Office Action for U.S. Appl. No. 11/157,192, dated Jun. 15, 2009.

Information Disclosure Statement for U.S. Appl. No. 11/157,192, dated Jun. 29, 2009.

US 8,138,114 B2

METHODS AND FORMULATIONS FOR ENHANCING $NH_3$ ADSORPTION CAPACITY OF SELECTIVE CATALYTIC REDUCTION CATALYSTS

CROSS-REFERENCE TO RELATED APPLICATIONS

This application is a divisional of U.S. application Ser. No. 11/539,722 filed Oct. 9, 2006, now U.S. Pat. No. 7,811,961, issued on Oct. 12, 2010, the disclosure of which is incorporated in its entirety by reference herein.

BACKGROUND OF THE INVENTION

1. Field of the Invention

One aspect of the present invention is related to methods for enhancing $NH_3$ adsorption capacity of selective catalytic reduction catalysts.

2. Background Art

Environmental concerns and governmental regulations have been a continuing impetus for improvements in pollution control from automotive vehicles. The treatment or removal of noxious combustion by-products from the vehicle exhaust stream is a major focus of such efforts. Typically, these combustion by-products include incomplete combustion by-products such as carbon monoxide and hydrocarbons. Moreover, the exhaust of these vehicles may include various nitrogen oxides (NOx) and sulfur oxides. It is desirable and, in certain instances, mandated that certain of these compounds be reduced during vehicle operation.

Currently, the exhaust systems of automotive vehicles include one or more catalyst systems to affect the control of such by-products. One known system utilizes a selective catalytic reduction (SCR) process to control emissions of potentially harmful by-products, e.g. to reduce the amount of NOx exiting the vehicle exhaust. These systems have been implemented in lean burn engine vehicles, such as diesel engine vehicles. The system utilizing the SCR process, i.e. the SCR system, includes a substrate upon which a SCR catalyst composition is applied (via a wash coating process, for example). The SCR catalyst composition includes an SCR catalyst, which can be a vanadium-based catalyst or zeolite-containing catalyst. According to one SCR process, a gaseous or liquid reductant is added to a flue gas stream and is adsorbed onto a SCR catalyst. $NH_3$ can be used as the reductant, and can be delivered in gaseous form or via urea injection with subsequent decomposition to $NH_3$.

The reduction of NOx with $NH_3$ over SCR catalysts can be significantly influenced by the amount of $NH_3$ adsorbed on the catalysts. An increase in $NH_3$ adsorption capacity can increase the catalytic rate of reduction. In many applications, the SCR reaction occurs at temperatures above 150° C., and therefore, it may be desirable in such applications to use have SCR catalysts that have a substantial adsorption capacity of $NH_3$ at temperatures that exceed 150° C. In certain applications, it is desirable to have SCR catalysts possessing a relatively high capacity of $NH_3$ adsorption and relatively strong bonding to $NH_3$.

One common drawback of certain known SCR systems is $NH_3$ slip, which occurs when exhaust gas temperatures are too cold for the SCR reaction to occur and/or too much reductant is fed into the exhaust gas stream for the amount of NOx in the stream. A variety of strategies have been developed to deal with $NH_3$ slip, including the fitting of extra catalysts after the SCR catalyst.

In light of the foregoing, methods and formulations relating to SCR for addressing one or more of the disadvantages and/or providing one or more of the benefits identified above is needed.

SUMMARY OF THE INVENTION

One aspect of the present invention is a method relating to SCR for enhancing the $NH_3$ adsorption capacity of SCR systems is provided. Another aspect of the present invention is a method relating to SCR for enhancing the $NH_3$ bonding strength of SCR systems is provided. Yet another aspect of the present invention is a method relating to SCR for providing substantial $NH_3$ adsorption capacity at relatively high temperatures, e.g., greater than 150° C. is provided. In yet another aspect of the present invention, a method relating to SCR for addressing $NH_3$ slip is provided.

According to one embodiment of the present invention, a method of providing an automobile exhaust catalyst composition is disclosed. The method includes acidifying a support composition with a conjugate base oxide of an inorganic acid having a Ka to obtain an acidified support exhaust catalyst composition. The support composition includes a combination of a cerium-containing oxide compound and non-cerium-containing compound selected from the group consisting of alkali metal containing compounds, alkaline-earth metal containing compounds and combinations thereof.

DETAILED DESCRIPTION OF EMBODIMENTS OF THE PRESENT INVENTION

Figure 1A:
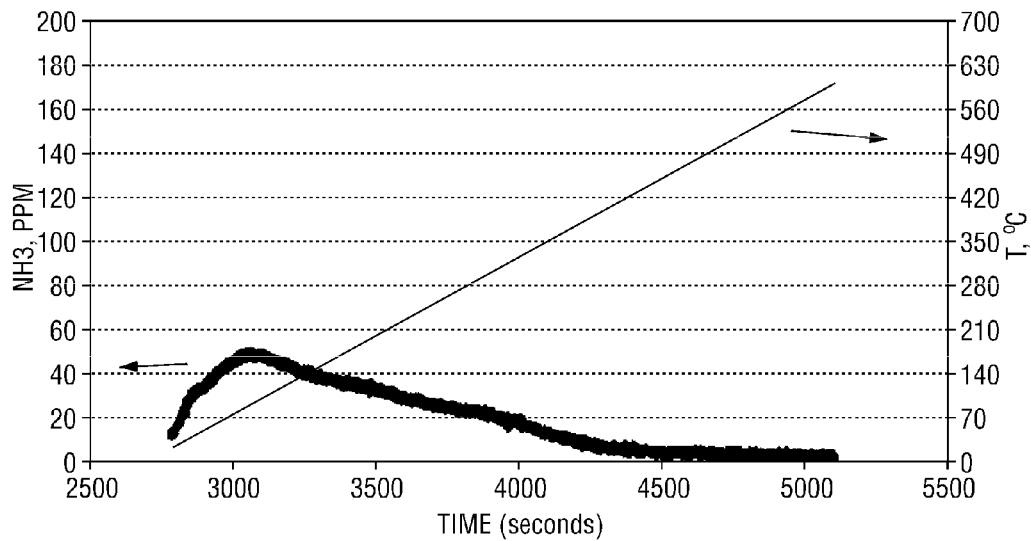
FIG. 1A depicts the $NH_3$ desorption characteristics of an unmodified alumina catalyst support as a function of time and temperature according to one embodiment of the present invention.

Except where expressly indicated, all numerical quantities in this description indicating amounts of material or conditions of reaction and/or use are to be understood as modified by the word "about" in describing the broadest scope of the present invention. Practice within the numerical limits stated is generally preferred.

The description of a single material, compound or constituent or a group or class of materials, compounds or constituents as suitable for a given purpose in connection with the present invention implies that mixtures of any two or more single materials, compounds or constituents and/or groups or classes of materials, compounds or constituents are also suitable. Also, unless expressly stated to the contrary, percent, "parts of," and ratio values are by weight. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

In at least one embodiment of the present invention, a selective catalytic reduction (SCR) system and method is disclosed. The SCR system includes a SCR catalyst composition, which includes SCR catalyst, for example, a vanadium-based catalyst or zeolite-containing catalyst. The SCR catalyst composition can also include a catalyst support composition. Such support compositions can provide a mechanism for holding and dispersing the active components of the SCR catalyst composition and for increasing the surface area for adsorption of the species being altered by the action of the catalyst. Suitable supports include, but are not limited to, $Al_2O_3$, $SiO_2$, $TiO_2$, $ZrO_2$, $CeO_2$ and combinations thereof. The support composition can be delivered to the SCR catalyst composition via a molecular sieve or sol-gel process known to one of ordinary skill in the art. Further, the supports composition can be provided as a powder and mixed in with the other components of the SCR catalyst composition in forming a slurry mixture to be applied by a washcoating process.

The SCR catalyst composition can also include a metal or metal-containing compound. Suitable non-limiting examples of metals include those from the group of metals known as the noble metal group (Ru, Rh, Pd, Os, Ir and Pt) and certain metals (Fe, Cu and Ag) from the group known as the late transition metal group. In certain embodiments, Pt, Pd and Rh can be utilized.

The SCR catalyst composition can also include a combination of a cerium-containing oxide compound and non-cerium-containing metal compound selected from the group consisting of alkali metal containing compounds, alkaline-earth metal containing compounds and combinations thereof. Suitable cerium-containing oxides include mixed oxides selected from the group consisting of Ce/Zr oxide, Ce/Pr oxide, Ce/Pr/Zr oxide, and combinations thereof.

The SCR catalyst composition can also include metal ions of a metal or metal-containing compound bonded to a conjugate base of an inorganic acid. The metal ions that are bonded to the conjugate base can be selected from the group consisting of alkali metal ions, alkaline-earth metal ions, and combinations thereof. Suitable metal ions include, for example, ions derived from Ba, Li, Na, K, Cs, Mg, Ca, Sr and combinations thereof. Typically, the metal or metal containing compound will alter the amount of a chemical component in the automobile exhaust (e.g., the NO, CO, $SO_2$, hydrocarbons, etc). Moreover, the conjugate base of an inorganic acid can be a conjugate base oxide of an inorganic acid. As used herein in at least one embodiment of the present invention, "conjugate base" means the ion formed when an acid loses one or more hydrogen ions (i.e., H+). As used herein in at least one embodiment of the present invention, "conjugate base oxide" means a conjugate base that has one or more bonds between oxygen and another element.

In at least one embodiment, the inorganic acid for which the base oxide is conjugate has a Ka such that the SCR catalyst composition provides enhanced $NH_3$ adsorption and/or increases the number of acid sites on the SCR system for adsorbing $NH_3$. Typically, this inorganic acid has a Ka value from about $5.0 \times 10^{-7}$ to about 1.0. In other variations, the inorganic acid for which the base oxide is conjugate has a Ka value from about $5.0 \times 10^{-5}$ to about $1.0 \times 10^{-1}$.

The conjugate base oxides are derived from acids selected, for example, from the group consisting of $H_3PO_4$, $H_2TiO_3$, $H_2WO_4$, $H_2MoO_3$, $HTa_2O_6$, $HNb_2O_6$, $H_2CrO_4$ and combinations thereof. In at least one embodiment of the present invention, the component having metal ions bonded to a conjugate base oxide of an inorganic acid is present in an amount from about 0.3 weight percent to about 50 weight percent of the total weight of the SCR catalyst composition. In at least one embodiment of the present invention, the component having metal ions bonded to a conjugate base oxide of an inorganic acid is present in an amount from about 1 weight percent to about 20 weight percent of the total weight of the SCR catalyst composition.

According to at least one embodiment of the present invention, an SCR catalyst system is made by first forming a slurry mixture of powders of each of the constituents included in the SCR catalyst composition and a suitable solvent, e.g. water. The slurry mixture is washcoated onto a substrate, such as the interior channels of a honeycombed-shaped brick. The coated brick is then dried and calcined at a relatively high temperature, e.g. greater than 500° C. Accordingly, the conjugate base oxides can be milled or ground into fine particles suitable for washcoating onto the substrate. Alternatively, the conjugate base oxide can be provided as nanoparticles to allow facile incorporation into SCR catalyst compositions.

The following examples illustrate the various embodiments of the present invention. Those skilled in the art will recognize many variations that are within the spirit of the present invention and scope of the claims.

EXAMPLE 1

The modification of alumina with phosphoric acid (P) was accomplished by dissolving a known amount of phosphate-salt into a predetermined volume of distilled water, adding a weighed sample of gamma-alumina into the solution under constant agitation, drying the solid mixture at 70° C., and calcining the solid sample at 600° C. for 6 hours.

According to this Example, a 3.2% of P doped on alumina (i.e. $Al_{2-3.20}P$) was prepared by (1) dissolving 0.6818 grams of $(NH_4)_2HPO_4$ in distilled water to form 9.150 ml solution, (2) adding 5.01 grams of high purity gamma-alumina into the solution with constant stirring, (3) drying the resulted mixture at 70° C. overnight, and (4) calcining the dried mixture at 600° C. for 6 hours. The high purity gamma-alumina used in this Example is available under the tradename M1307 from W.R. Grace & Co. of Columbia, Md. Table 1 lists several examples of phosphate-modified alumina that were made with various weight percentages of phosphorus.

TABLE 1

| P-modified alumina | P % | Alumina weight (g) | $(NH_4)_2HPO_4$ weight (g) | Solution volume(ml) |
|---|---|---|---|---|
| $Al_{2-0.16}P$ | 0.16 | 5.01 | 0.03406 | 9.150 |
| $Al_{2-0.32}P$ | 0.32 | 5.01 | 0.06813 | 9.150 |
| $Al_{2-0.80}P$ | 0.80 | 5.01 | 0.1704 | 9.150 |
| $Al_{2-1.60}P$ | 1.60 | 5.01 | 0.3406 | 9.150 |
| $Al_{2-3.20}P$ | 3.20 | 5.02 | 0.6818 | 9.150 |

For comparison purposes, an unmodified alumina was prepared in the same way as described above for the phosphate-doped alumina sample, by providing a distilled water solution having a volume of 9.50 ml, (2) adding 5.00 grams of high purity gamma-alumina into the solution with constant stirring, (3) drying the resulted mixture at 70° C. overnight, and (4) calcining the dried mixture at 600° C. for 6 hours.

The P-modified (3.2 wt % $P/Al_2O_3$) and unmodified alumina catalyst supports were each saturated with 300 PPM $NH_3$ and then exposed to thermal heating. 0.1939 grams of the P-modified alumina was saturated and thermally heated, while 0.2056 grams of the unmodified alumina was saturated and thermally heated.

FIG. 1A depicts the $NH_3$ desorption characteristics of the unmodified alumina catalyst support as a function of time and temperature. According to FIG. 1A, a relatively large amount of desorption occurred in a relatively low temperature range, i.e. from 70° C. to 170° C. Moreover, the total amount of $NH_3$ desorbed during thermal heating was 0.507 ml. Accordingly, 2.47 ml of $NH_3$ was desorbed per gram of alumina.

Figure 1B:
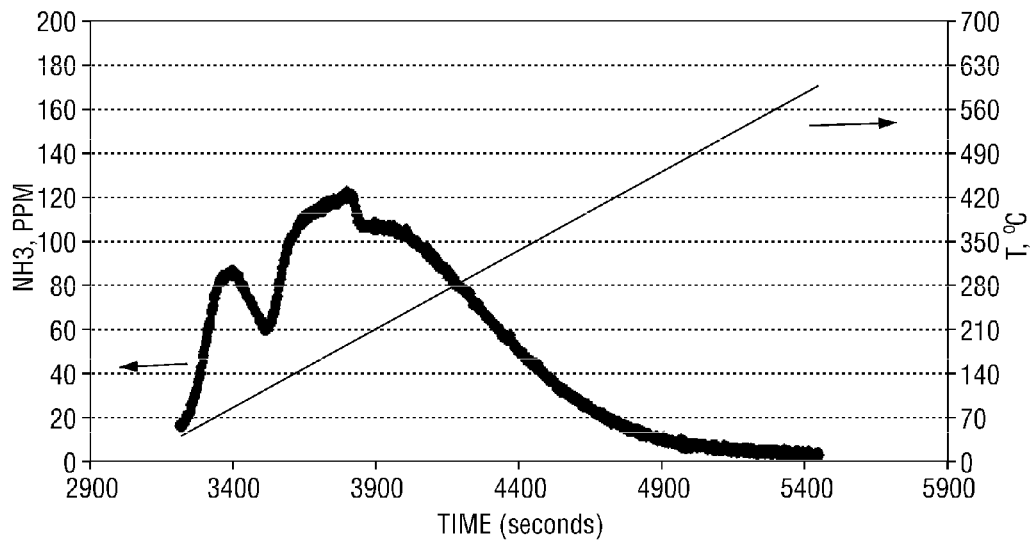
FIG. 1B depicts the $NH_3$ desorption characteristics of a P-modified alumina catalyst support as a function of time and temperature according to one embodiment of the present invention.

FIG. 1B depicts the $NH_3$ desorption characteristics of the P-modified alumina catalyst support as a function of time and temperature. According to FIG. 1B, a relatively large amount of desorption occurred in a relatively higher temperature range than that of the unmodified alumina. The higher temperature range was 140° C. to 420° C. This result confirms the relative high $NH_3$ bonding strength of the P-modified alumina catalyst support at relatively high temperatures. This beneficial result may also provide decreased $NH_3$ slip during operation. Moreover, the total amount of $NH_3$ desorbed during thermal heating was 1.584 ml. Accordingly, 8.17 ml of $NH_3$ was desorbed per gram of P-modified alumina. Table 2 shows a comparison of the results of the P-modified and unmodified alumina tests.

TABLE 2

| Alumina | Alumina weight (g) | $NH_3$ desorbed (ml) | ml $NH_3$ desorbed per g alumina |
|---|---|---|---|
| unmodified | 0.2056 | 0.507 | 2.47 |
| P-modified | 0.1939 | 1.584 | 8.17 |

While not wanting to be bound to any particular theory or principle, the comparison demonstrates that the use of acidified catalyst materials can enhance the adsorption of $NH_3$ in quantity and in strength.

In at least one embodiment, it has been found that the acidified catalyst materials can provide $NH_3$ desorption per gram of P-modified alumina in the range of 2.5 to 20 ml. In at least one embodiment, it has been found that the acidified catalyst materials can provide beneficial $NH_3$ desorption in the range of temperatures from 150 to 350° C. These beneficial operating ranges are not provided by the non-modified alumina catalyst materials, as supported by the results of this Example.

As required, detailed embodiments of the present invention are disclosed herein. However, it is to be understood that the disclosed embodiments are merely exemplary of an invention that may be embodied in various and alternative forms. While embodiments of the have been illustrated and described, it is not intended that these embodiments illustrate and describe all possible forms of the invention. Rather, the words used in the specification are words of description rather than limitation, and it is understood that various changes may be made without departing from the spirit and scope of the invention.

In accordance with the provisions of the patent statute, the principle and mode of operation of this invention have been explained and illustrated in its various embodiments. However, it must be understood that this invention may be practiced otherwise than as specifically explained and illustrated without departing from its spirit or scope.

What is claimed:

1. A method of preparing an automobile exhaust gas catalyst composition, the method comprising:
    acidifying a support composition with a conjugate base oxide of an inorganic acid having a Ka to obtain an acidified support exhaust catalyst composition, the support composition includes a combination of a cerium-containing oxide compound and non-cerium-containing compound selected from the group consisting of alkali metal containing compounds, alkaline-earth metal containing compounds and combinations thereof.

2. The method of claim 1, wherein the Ka is in the range of $5.0 \times 10^{-7}$ to 1.0.

3. The method of claim 1, wherein the Ka is in the range of $5.0 \times 10^{-5}$ to $5.0 \times 10^{-1}$.

4. The method of claim 1, wherein the conjugate base oxide is the conjugate base of an acid selected from the group consisting of $H_3PO_4$, $H_2TiO_3$, $H_2WO_4$, $H_2MoO_4$, $HTa_2O_6$, $HNb_2O_6$, $H_2CrO_4$ and combinations thereof.

5. The method of claim 1, wherein the support composition is selected from the group consisting of $Al_2O_3$, $SiO_2$, $TiO_2$, $ZrO_2$, $CeO_2$ and combinations thereof.

6. The method of claim 1, wherein the $NH_3$ desorption per gram of acidified support composition is in the range of 3 to 25 ml upon substantially complete thermal release of $NH_3$ after saturation of the acidified support composition with $NH_3$.

7. The method of claim 1, wherein the acidified support composition desorbs a substantial amount of $NH_3$ in the range of temperatures from 150 to 350 ° C. during substantially complete thermal release of $NH_3$ after saturation of the acidified support composition with $NH_3$.

8. A method of preparing an automobile exhaust gas catalyst composition, the method comprising:
    providing a support composition including a combination of a cerium-containing oxide compound and non-cerium-containing compound selected from the group consisting of alkali metal containing compounds, alkaline-earth metal containing compounds and combinations thereof; and
    acidifying the support composition with a conjugate base oxide of an inorganic acid having a Ka to obtain an acidified support exhaust catalyst composition.

9. The method of claim 8, wherein the Ka is in the range of $5.0 \times 10^{-7}$ to 1.0.

10. The method of claim 8, wherein the Ka is in the range of $5.0 \times 10^{-5}$ to $5.0 \times 10^{-}$.

11. The method of claim 8, wherein the conjugate base oxide is the conjugate base of an acid selected from the group consisting of $H_3PO_4$, $H_2TiO_3$, $H_2WO_4$, $H_2MoO_4$, $HTa_2O_6$, $HNb_2O_6$, $H_2CrO_4$ and combinations thereof.

12. The method of claim 8, wherein the support composition is selected from the group consisting of $Al_2O_3$, $SiO_2$, $TiO_2$, $ZrO_2$, $CeO_2$ and combinations thereof.

13. The method of claim 8, wherein the $NH_3$ desorption per gram of acidified support composition is in the range of 3 to 25 ml upon substantially complete thermal release of $NH_3$ after saturation of the acidified support composition with $NH_3$.

14. The method of claim 8, wherein the acidified support composition desorbs a substantial amount of $NH_3$ in the range of temperatures from 150 to 350° C. during substantially complete thermal release of $NH_3$ after saturation of the acidified support composition with $NH_3$.

15. A method of forming an SCR catalyst system comprising:
    providing a substrate; and
    applying a support composition and a conjugate base oxide of an inorganic acid having a Ka to the substrate to obtain an SCR catalyst system, the support composition including a combination of a cerium-containing oxide compound and non-cerium-containing compound selected from the group consisting of alkali metal containing compounds, alkaline-earth metal containing compounds and combinations thereof.

16. The method of claim 15, wherein the applying step is carried out by wash coating the support composition and the conjugate base oxide of the inorganic acid having the Ka onto the substrate.

17. The method of claim 15, wherein the substrate is a brick substrate.

18. The method of claim 15, wherein the Ka is in the range of $5.0 \times 10^{-7}$ to $1.0$.

19. The method of claim 15, wherein the Ka is in the range of $5.0 \times 10^{-5}$ to $5.0 \times 10^{-1}$.

20. The method of claim 15, wherein the conjugate base oxide is the conjugate base of an acid selected from the group consisting of $H_3PO_4$, $H_2TiO_3$, $H_2WO_4$, $H_2MoO_4$, $HTa_2O_6$, $HNb_2O_6$, $H_2CrO_4$ and combinations thereof.

* * * * *